Oct. 4, 1932.      A. N. EMMONS      1,880,939
LATHE
Filed July 14, 1930      3 Sheets-Sheet 1

INVENTOR:
Arthur N. Emmons,
BY
Bodell & Thompson
ATTORNEYS.

Oct. 4, 1932.   A. N. EMMONS   1,880,939
LATHE
Filed July 14, 1930   3 Sheets-Sheet 3

INVENTOR:
Arthur N. Emmons,
BY Bedell & Thompson
ATTORNEYS.

Patented Oct. 4, 1932

1,880,939

UNITED STATES PATENT OFFICE

ARTHUR N. EMMONS, OF SYRACUSE, NEW YORK, ASSIGNOR TO THE PORTER-CABLE MACHINE COMPANY, OF SYRACUSE, NEW YORK, A CORPORATION OF NEW YORK

LATHE

Application filed July 14, 1930. Serial No. 467,729.

This invention relates to lathes, and has for its object, a noiseless and oil tight head stock construction and tool carriage feed mechanism, and also, a particularly simple and efficient motion transmitting mechanism between the head stock mechanism and the carriage feed mechanism by which the head stock spindle and the tool carriage feed mechanism are actuated from a common driver in contradistinction to the carriage feed mechanism being driven from the head stock spindle. Other objects will appear throughout the specification.

The invention consists in the novel features and in the combinations and constructions hereinafter set forth and claimed.

In describing this invention, reference is had to the accompanying drawings, in which like characters designate corresponding parts in all the views.

Figure 1:
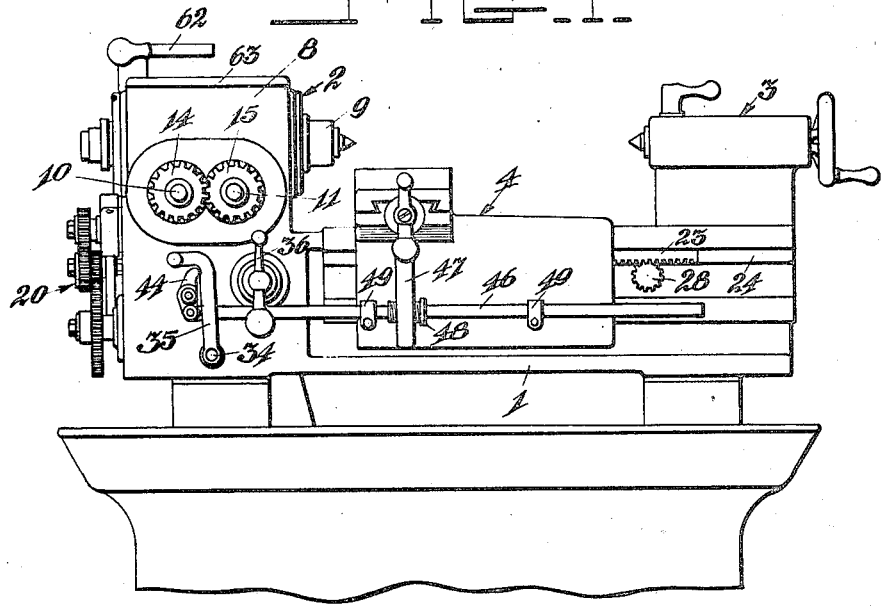
Figure 1 is a fragmentary side elevation of this lathe.
Figure 2:
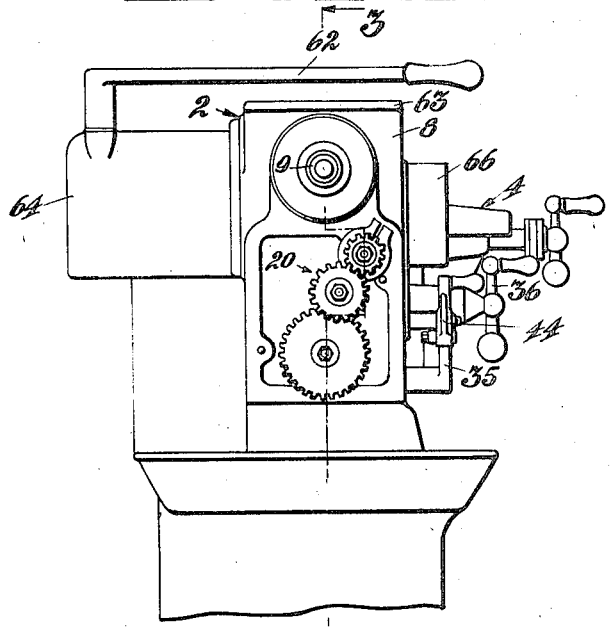
Figure 2 is an end elevation looking to the right in Figure 1.
Figure 3:
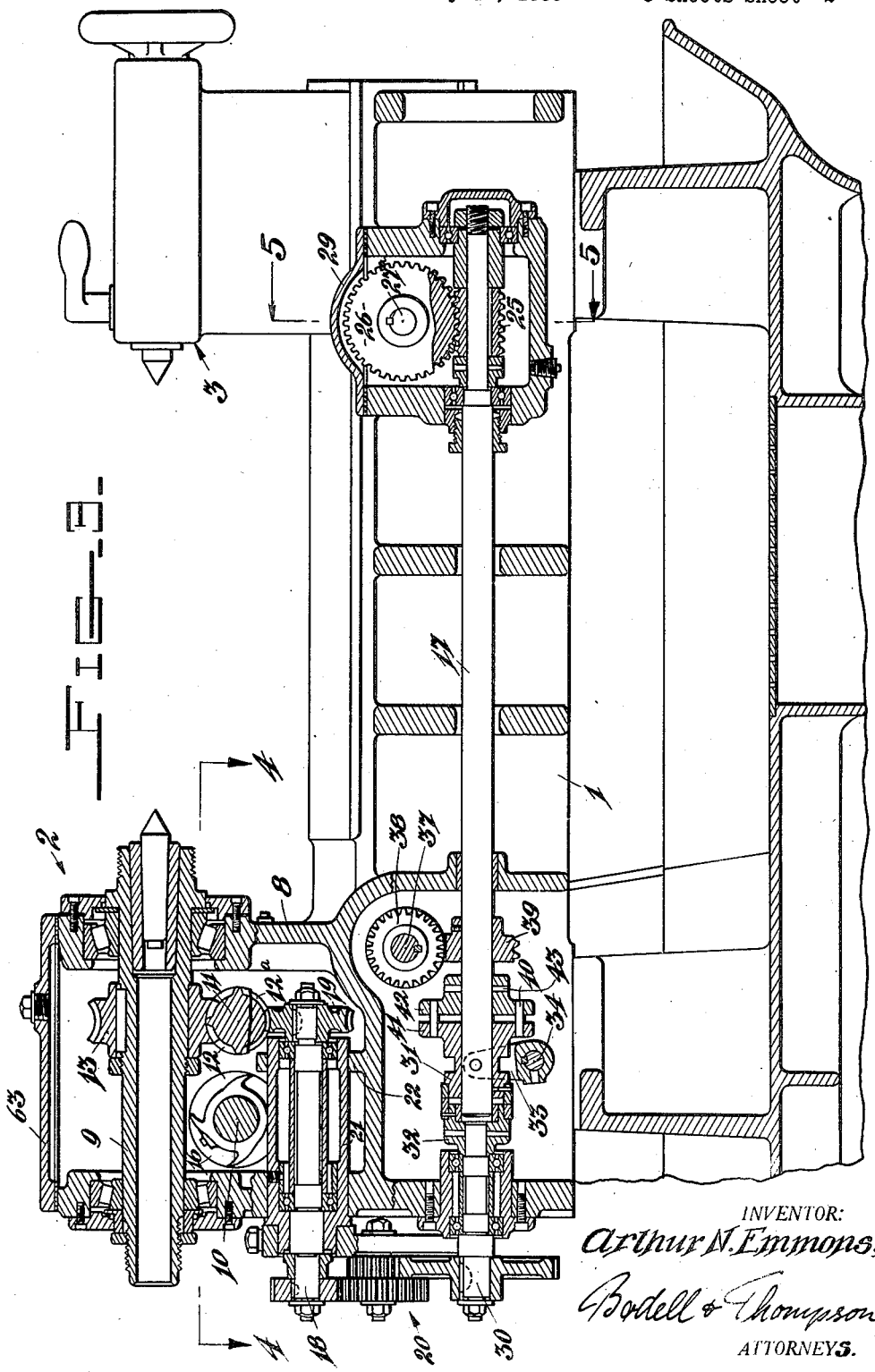
Figure 3 is a longitudinal sectional view taken centrally of the lathe, or on line 3—3, Figure 2.
Figure 4:
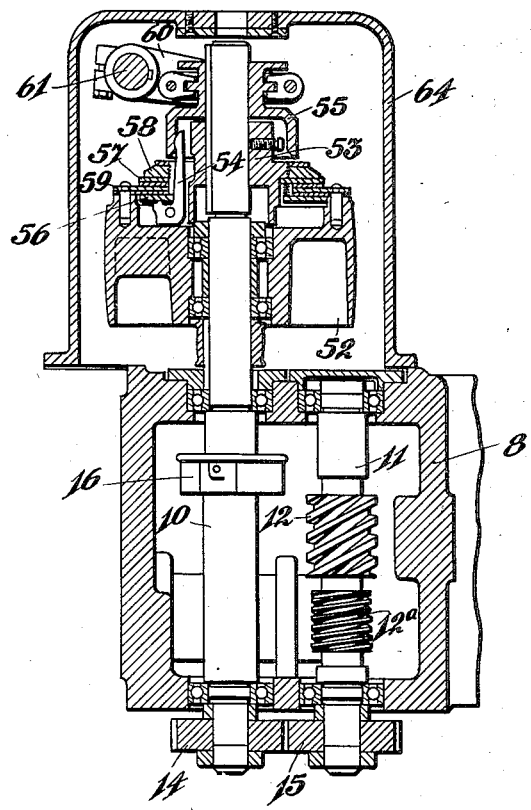
Figure 4 is a sectional view on line 4—4, Figure 3.
Figure 5:
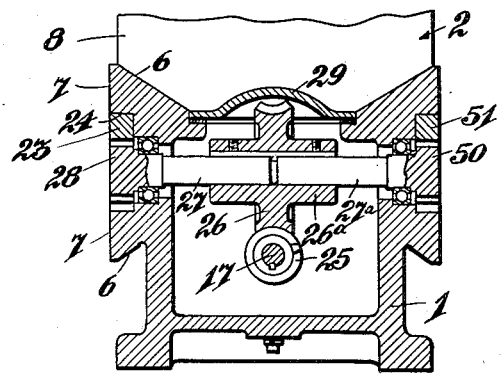
Figure 5 is a sectional view on line 5—5, Figure 3.

This lathe comprises a bed, head stock, tailstock, and movable tool carriage, a drive shaft, and motion transmitting means between the drive shaft and the head stock spindle, motion transmitting means between the drive shaft and the tool carriage feed mechanism, these two motion transmitting means having a member or shaft in common, and the greater part of such mechanisms being located in oil tight housing, and other parts outside the housing where they are readily accessible for effecting changes in speed of the head stock and of the tool carriage feed mechanism.

1 designates the bed which may be of any suitable form, size and construction. 2 the head stock, 3 the tail stock, and 4 the tool carriage.

The tail stock forms no part of this invention. It is mounted on ways on the rear side of the bed so that it is adjustable lengthwise of the bed without interfering with the travel of the tool carriage 4.

The tool carriage has ways 6 coacting with complemental ways 7 on the front side of the bed 1.

The head stock comprises an oil tight housing 8 usually formed integral with the bed 1, a head stock spindle 9 journalled in the housing, a drive shaft 10 extending through the housing and journalled therein and extending transversely of the spindle 9, a second shaft 11 extending transversely of the housing 8 and journalled therein, gearing as a worm 12 mounted on or integral with the shaft 11, and a worm gear 13 mounted on the spindle 9 within the oil tight housing 8, and other gearing as intermeshing spiral gears 14 and 15 mounted on the ends of the shafts 10 and 11 outside of the housing where they are readily interchangeable with gears of different diameter. The shafts 10 and 11 extend below the head stock spindle 9, and the shaft 10 is provided with an oil slinging member 16. The gears 14, 15, shaft 11, and the gearing 12 and 13 constitute motion transmitting means between the drive shaft 10 and the head stock spindle 9.

The motion transmitting means between the drive shaft 10 and the tool carriage 4 comprises a feed shaft 17 journalled in the bed, motion transmitting means between it and the tool carriage, and gearing between the shaft 17 and the drive shaft 11, the latter including a shaft 18 supported in the housing 8, a gear, as a worm gear 19 mounted on the inner end of the shaft 18 and meshing with the worm 12ª on the shaft 11, so that the shaft 11 is common to the motion transmitting gearing between the drive shaft 10 and the spindle 9 and between the drive shaft 10 and the shaft 18 of the tool carriage feed mechanism.

The shaft 18 is connected to the shaft 17 through a train of gearing 20 located outside of the housing 8 and the bed 1 where the gears thereof are readily interchangeable to effect different speed ratios between the head stock spindle 9 and the tool carriage. The last of the gears of the train 20 is mounted on a shaft alined with the shaft 17 and connectible thereto and disconnectible therefrom by a clutch.

The shaft 18 is here illustrated as mounted in a suitable tubular carrier 21 which is supported at its outer end in one of the walls of the head stock housing 8, and at its inner end in a bracket 22 in the housing 8. Owing to the mounting of the shaft 18 in the carrier 21, these two parts are assembled as a unit in the housing and removed and replaced as a unit.

The tool carriage 4 moves along the ways 7 and is provided with a rack 23 extending lengthwise of the bed and slidable in a suitable channel 24 in the bed. The motion transmitting means between the feed shaft 17 and the carriage comprises intermeshing worm gearing, as a worm 25 mounted on the shaft 17, and a worm gear 26 mounted on the shaft 27 journalled in the bed and having a pinion 28 meshing with the rack 23. These gears 25, 26 are mounted in an oil tight compartment formed in the bed 1, which compartment is provided with a removable cap 29.

The shaft 17 is connectible to and disconnectible from the remaining portion of the driving mechanism for the tool carriage for the purpose of feeding the tool carriage by hand, and as here shown, it is connectible and disconnectible from a shaft 30 arranged in axial alinement therewith and journalled in the end wall of the bed 1, by means of a shiftable clutch section 31 mounted on the shaft 17 and coacting with the clutch section 32 on the shaft 30, this clutch section being operated by a shifting arm 33 mounted on a rock shaft 34 journalled in the bed and extending to the outside thereof, and having an operating lever 35 at its outer end on the front side of the bed. Movement of the lever 35 to the left engages the clutch section, and to the right disengages the clutch section. The shaft 17 can be operated when the clutch is disengaged by means of a crank 36 mounted on the front side of the lathe on a shaft 37 and having a spiral gear 38 thereon within the bed and meshing with a spiral gear 39 on the shaft 17.

The clutch section 31 is connected to the shaft 17 to rotate therewith by means of pins 40 slidably in a collar 41 integral with the clutch section 31, the pins 40 extending through holes in a similar collar 42 keyed at 43 to the shaft 17.

The lever 35 is automatically thrown out by the tool carriage when the carriage reaches the limit of its feeding movement by any suitable means. That here shown is a trip lever 44 pivoted between its ends to the bed, and connected to a rod 46 slidably mounted in the tool carriage 4, or in a projecting lug or bracket 47 on the front side thereof. This lug or bracket is provided with an adjustable shoulder 48 threading thereinto which works between spaced apart knock off shoulders 49 adjustably mounted on the rod 46. When the carriage 4 is fed to the limit of its movement to the right, the shoulder 48 engages the right hand shoulder 49, thus moves the trip lever on its pivot, and it in turn by thrusting against the lever 35, moves the lever 35 to the right disengaging the clutch sections 31, 32. When the carriage is fed in the reverse direction, the shoulder 48 will engage the left hand shoulder 49 and will move the lower end of the lever 44 away from the lever 35 and the upper end of the trip lever 44 against the lever 35, thus again throwing out the clutch. The direction of the feed of the carriage by the shaft 17 is controlled by the number of gears in the train 20, in the usual manner.

The shaft 27 of the tool carriage feed mechanism is also provided with a pinion 50 at its rear end similar to the pinion 28, the pinion 50 being intended to mesh with a rack 51 connected to a facing attachment or extra carriage, not shown.

The shaft 27 is formed of two sections and the pinions 28, 50 formed integral with the sections respectively. The section on which the pinion 50 is formed is designated 27$^a$. The sections and pinions are thus stem gears. The hub 26$^a$ of the worm gear 26 receives the inner ends of both sections and is keyed thereto. In assembling, the shaft sections are pushed through the bearings in the walls of the bed 1 and into the hub of the gear 26.

The drive shaft 10 extends out of the head stock housing 8 to the rear side of the lathe, and is provided with a driving member as a pulley 52 thereon which is connectible to and disconnectible from the drive shaft 10 by a manually operable clutch.

The clutch may be of any suitable construction, and the construction forms no part of this invention. The clutch here shown is of the friction type and includes a hub 53 mounted on the shaft 10 and carrying clutch or cam levers 54 which are operated by a collar 55 slidable lengthwise of the shaft 10, these clutch or cam levers 54 acting to compress a disk 56 toward disks 57 carried by the hub 53, and thrusting against an abutment 58 on said hub, and thus compress between them a disk 59 carried by the pulley 51. The collar 55 is actuated or shiftable axially of the shaft 10 by means of a suitable fork 60 mounted on a shaft 61 extending upwardly and provided with a handle 62 at its upper end. The top of the head stock housing 8 is provided with a suitable cap 63. The pulley 51 and associated clutch mechanism is mounted in a detachable housing 64 secured to the head stock housing 8. The gears 14, 15 are normally enclosed in a suitable removable cover 66, and the gears 20 are also enclosed in a suitable removable cover not shown. The pulley 52 is driven by a belt running over a pulley on an electric motor not shown, concealed in the base of the lathe, or belt from countershaft.

This lathe is particularly advantageous in that the different speed changes can be made by the use of a few gears located outside of the oil housing, and in that the greater part of the gearing is located in an oil housing, and further, in that owing to the arrangement of the gearing between the drive shaft, the head stock spindle and the tool carriage, that is, owing to the fact that the head stock spindle and the tool carriage are driven from a drive shaft, and hence, the tool carriage not driven from the spindle, the vibration and chatter of the spindle is eliminated, and the head stock spindle runs smoothly.

What I claim is:

1. In a lathe, a frame, a movable tool carriage, a head stock, the head stock comprising a housing, a head stock spindle journalled in the housing, a drive shaft journalled in the housing, tool carriage feed mechanism comprising a shaft mounted in the head stock housing, gearings between the drive shaft and the head stock spindle and between the drive shaft and the tool carriage mechanism shaft including an element common to both of the said gearings, and a pair of intermeshing gears, one being mounted on the drive shaft outside the housing, and the other on said element outside of the housing.

2. In a lathe, the combination of a frame, a tool carriage and head stock, the head stock comprising a housing, a head stock spindle journalled in the housing, a drive shaft journalled in the housing and extending transversely of the spindle, a second shaft mounted in the housing and extending transversely of the spindle, said shafts extending outside of the housing, intermeshing gears mounted on the ends of the shafts outside the housing, gearing between the second shaft and the spindle mechanism for feeding the tool carriage comprising a driving shaft journalled in the head stock housing parallel to the spindle, and gearing between the tool carriage drive shaft and said second shaft.

3. In a lathe, the combination of a frame, a tool carriage and head stock, the head stock comprising a housing, a head stock spindle journalled in the housing, a drive shaft journalled in the housing and extending transversely of the spindle below the same, a second shaft journalled in the housing and extending parallel to the drive shaft below the spindle, said shafts extending outside of the housing, intermeshing gears mounted on said shafts outside of the housing, intermeshing worm and worm gear mounted respectively on the second shaft and the spindle, mechanism for feeding the tool carriage including a shaft extending into the head stock housing parallel to the spindle and below the driving shaft and the second shaft, the tool carriage feed shaft and the second shaft having intermeshing worm gearing located in the head stock housing.

4. In a lathe, the combination of a frame, a tool carriage and head stock, the head stock comprising a housing, a head stock spindle journalled in the housing, a drive shaft journalled in the housing and extending transversely of the spindle below the same, a second shaft journalled in the housing and extending parallel to the drive shaft below the spindle, said shafts extending outside of the housing, intermeshing gears mounted on said shafts outside of the housing, intermeshing worm and worm gear mounted respectively on the second shaft and the spindle, mechanism for feeding the tool carriage including a shaft extending into the head stock housing parallel to the spindle and below the driving shaft and the second shaft, the tool carriage feed shaft and the second shaft having intermeshing worm gearing located in the head stock housing, a driving member mounted on the drive shaft outside of the housing, and a clutch for connecting and disconnecting the driving member and the drive shaft.

5. In a lathe, a bed, a head stock, a tool carriage movable along the bed, the head stock comprising a housing, a head stock spindle journalled in the housing, a drive shaft journalled in the housing and extending transversely of the head stock spindle and projecting through one side of the housing, a second shaft journalled in the housing and extending transversely of the head stock spindle and projecting through one side of the housing adjacent the end of the drive shaft, said shafts having intermeshing changeable gears on their projecting ends, tool carriage feed mechanism including a third shaft mounted in the head stock housing and gearing between the second shaft and the head stock spindle and between the second shaft and the tool carriage mechanism shaft.

6. In a lathe, a bed, a tool carriage movable along the bed, a head stock mechanism located at one end of the bed, motion transmitting means between the head stock mechanism and the tool carriage to feed the same along the bed including an oil tight housing located near the other end of the bed, a feed shaft journalled in the bed and extending lengthwise thereof and through the oil housing, a second shaft journalled in the bed and extending transversely thereof and through the oil housing, gearing between said shafts, a pinion secured to one end of the second shaft and a rack on the tool carriage meshing with said pinion.

In testimony whereof, I have hereunto signed my name, at Syracuse, in the county of Onondaga, and State of New York, this 8th day of July, 1930.

ARTHUR N. EMMONS.